United States Patent [19]
Bishel

[11] 3,851,143
[45] Nov. 26, 1974

[54] WELD ROD

[75] Inventor: Robert A. Bishel, Huntington, W. Va.

[73] Assignee: The International Nickel Company, Inc., New York, N.Y.

[22] Filed: Dec. 10, 1973

[21] Appl. No.: 423,292

Related U.S. Application Data

[63] Continuation-in-part of Ser. No. 239,531, March 29, 1972, Pat. No. 3,778,588.

[52] U.S. Cl.................... 219/146, 148/26, 219/137
[51] Int. Cl............................................. B23k 35/22
[58] Field of Search .......... 29/495, 496; 148/24, 26; 219/145, 146, 137

[56] References Cited
UNITED STATES PATENTS

| | | | |
|---|---|---|---|
| 2,977,676 | 4/1961 | Sherwin et al. | 29/495 |
| 3,056,196 | 10/1962 | Berg | 29/496 |
| 3,114,033 | 12/1963 | Elster et al. | 219/146 |
| 3,328,557 | 6/1967 | Rogers et al. | 219/146 |
| 3,345,496 | 10/1967 | Rogers et al. | 219/146 |
| 3,577,849 | 5/1971 | Roberts | 148/26 X |

Primary Examiner—J. V. Truhe
Assistant Examiner—N. D. Herkamp

[57] ABSTRACT

A cored wire welding electrode for welding cast iron having an outer sheath made of nickel or a nickel-iron alloy and a powdered core composition containing copresent metallic magnesium, special amounts of graphite and slag-forming ingredients. The electrode is particularly useful for open arc welding wherein a high strength weld deposit is required.

1 Claim, No Drawings

WELD ROD

The present application is a continuation-in-part of U.S. application Ser. No. 239,531 filed on Mar. 29, 1972 now U.S. Pat. No. 3,778,588.

In U.S. application Ser. No. 239,351 applicant disclosed certain improvements related to weld rods suitable for high rate arc welding of cast iron by automatic coil fed welding machines. In his prior application, applicant discloses "a cored-wire welding electrode adapted to weld gray cast iron or ductile cast iron comprising a tube of an alloy containing about 45% to about 100% nickel with the balance, if any, being essentially iron, the tube comprising about 75% by weight of the total electrode and enclosing core composition which comprises the balance of the electrode. The core composition contains, in per cent by weight of core composition, a mixture of fine powders comprising about 0.7% to about 3.5% magnesium advantageously alloyed in a concentration of less than about 70% (as, for example, in the form of about 5% to about 20% nickel-magnesium alloy containing about 14% to 17% magnesium and/or in the form of a magnesium-aluminum alloy containing about 65% magnesium) about 5% to about 25% graphite up to about 10% aluminum, up to about 3% alloyed calcium metal, up to 7% metallic silicon, both calcium and silicon being present, for example, in the form of up to about 7% calcium-silicon alloy with the calcium being about 30% to 33% of the alloy or with silicon being present in the form of up to about 20% of an alloy containing about 60% nickel, 30% silicon and about 10% iron, up to about 15% electrolytic manganese (or up to about 35% ferromanganese), about 30% to about 60% or even 75% calcium fluoride, up to 15% cryolite, up to about 6% periclase, i.e., magnesium oxide, and up to about 4% barium fluoride. The core can also contain up to about 5% titanium as titanium metal or nickel-titanium or ferro-titanium alloy, up to about 25% iron, up to about 36% nickel, the iron and the nickel ranges being inclusive of iron and nickel alloyed with magnesium, silicon, manganese, titanium and the like, up to about 5% barium carbonate, up to 5% strontium carbonate, up to about 25% calcium carbonate, up to 10% manganese dioxide and up to about 4% zirconium oxide. The core compositions used in the electrode of the present invention can also include as slag-forming substances up to about 20% calcined alumina, up to about 10% calcium silicate, up to about 10% hematite (ferric oxide), up to about 5% lithium carbonate, up to about 5% lithium fluoride, up to about 20% nepheline syanite, up to about 5% potassium zirconium fluoride, up to about 10% titanium dioxide and up to about 10% sodium fluoride. Other metallics which can be incorporated into the core composition include up to about 6% columbium, as, for example, up to about 10% ferrocolumbium, up to about 4% molybdenum as, for example, up to about 5% ferromolybdenum, up to about 6% of rare earth silicide and up to about 10% tungsten. Generally speaking, the ratio of nickel to metallic iron in the electrode is at least about 0.67."

Further, applicant discloses in his parent U.S. application Ser. No. 239,531 that advantageous weld rods can include ingredients, in per cent by weight of the total weight of the core and the tubular sheath as set forth in Table I.

TABLE I

| Ingredient | Specific Example % by weight | Advantageous Range % by weight |
|---|---|---|
| Carbon (as graphite) | 3.60 | 1.5 – 7.5 |
| Manganese | 1.55 | up to 7.5 |
| Iron | 33.70 | 9 – 42 |
| Nickel | 42.80 | 29.3 – 76 |
| Nickel & Iron | — | 65 – 85 |
| Silicon (metallic) | 0.875 | up to 2.5 |
| Copper | 0.035 | up to 0.7 |
| Aluminum | 0.030 | up to 2 |
| Calcium (metallic) | 0.38 | up to 1 |
| Magnesium (metallic) | 0.42 | 0.25 – 1.0 |
| CaF$_2$ | 13.10 | 8 – 18 |
| Na$_3$AlF$_6$ | 2.25 | 0 – 3 |
| BaF$_2$ | 0.75 | 0 – 1.5 |
| MgO | 0.51 | 0.25 – 1.5 |

In his parent application, applicant also discloses that while "it has been stated hereinbefore that the tube portion of the welding electrode of the present invention comprises about 75% by weight of the electrode with the core being the balance, those skilled in the art will appreciate that some modification of this ratio is possible. For example, if the core composition is modified to include iron and nickel in the maximum amounts as set forth hereinbefore, the weight of the tubular sheath can be as low as about 55% by weight of the total electrode. Thus, it is within the contemplation of a more advantageous aspect of the present invention that the tube can comprise about 55% to about 80% by weight of the welding electrode provided that the total per cent of nickel plus iron in the electrode is about 65% to about 85% and the ratio of the nickel to iron is about 0.82 to about 1.6. It is generally advantageous to maintain the tubular sheath at about 65% to 80% by weight of the electrode with the core being about 20% to 35% by weight of the electrode and to form the sheath from an alloy containing a maximum of about 75% nickel."

It has now been discovered that by decreasing slightly the carbon content of the flux-cored weld wire of the parent application, a weld wire can be produced which will deposit higher strength weld deposits when used in the open-arc welding method.

It is an object of the present invention to provide a novel flux-cored weld wire adapted to produce higher strength weld deposits.

Other objects and advantages will become apparent from the following description, treated as modifying the aforequoted sections from parent application Ser. No. 239,531 and all other parts of the disclosure of said parent application, the totality of which is incorporated herein by reference.

Generally speaking, in accordance with the present invention the carbon content of the flux cored welding electrodes of parent application Ser. No. 239,531 is lowered to 3 to 5 percent by weight of the core ingredients to provide higher strength weldments. As disclosed in the parent application, the carbon content of the welding electrode is contained essentially in the core in the form of graphite.

In order to demonstrate the effect of carbon in the welding electrodes a series of electrodes were made having a sheath of nickel-iron alloy containing about 55 percent nickel balance essentially iron, with a standard core-flux composition having manganese at the 12 percent level and varying amounts of graphite within the range of 4 to 14 percent by weight of core material. The results of welding with these electrodes under standard conditions are set forth in the following Table II.

TABLE II

| Ex. No. | % C in Core | Tensile Strength (k.s.i.) | Deposit Elongation (%) | Carbon in deposits (%) |
|---|---|---|---|---|
| 1 | 4 | 77.3 | 16.5 | 0.73 |
| 2 | 6 | 71.5 | 16.5 | 0.91 |
| 3 | 8 | 64.5 | 10.0 | 1.05 |
| 4 | 10 | 63.2 | 11.5 | 1.30 |
| 5 | 12 | 62.6 | 11.5 | 1.52 |
| 6 | 14 | 55.1 | 8.0 | 1.74 |

The foregoing Table II shows that as the carbon decreases to within a range of 3 to 5 percent by weight of the core ingredients the strength of the deposit increases while the ductility remains at a high level.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a welding electrode particularly adapted to be coil-fed to automatic welding machines and to weld cast iron at high rates using an open-arc comprising a tubular sheath of metal containing about 45 percent to about 100 percent by weight of nickel with the balance, if any, being essentially iron enclosing a core comprising a mixture of powders containing, in per cent by weight of core ingredients, about 0.7 percent to about 3.5 percent of metallic magnesium, about 5 percent to about 25 percent graphite and about 30 percent to about 75 percent calcium fluoride, the balance of said core comprising slag forming and metallic ingredients said core being balanced with respect to said tubular sheath such that said tubular sheath comprises about 55 percent to about 80 percent by weight of the total electrode, such that the total per cent of metallic nickel plus metallic iron in the total electrode is about 65 percent to about 80 percent and such that the ratio of nickel to metallic iron in the total electrode is at least about 0.67, the improvement comprising lowering the carbon content to within a range of about 3 to 5 percent by weight of the core ingredients to increase the strength of weldments made with the welding electrode.

* * * * *

UNITED STATES PATENT OFFICE
CERTIFICATE OF CORRECTION

Patent No. 3,851,143　　　　　　　　Dated 11/26/74

Inventor(s) Robert A. Bishel

It is certified that error appears in the above-identified patent and that said Letters Patent are hereby corrected as shown below:

The term of this patent subsequent to December 11, 1990, has been disclaimed.

Signed and Sealed this

Thirteenth Day of July 1976

[SEAL]

Attest:

RUTH C. MASON
*Attesting Officer*

C. MARSHALL DANN
*Commissioner of Patents and Trademarks*